(12) United States Patent
Iizuka et al.

(10) Patent No.: US 6,387,310 B1
(45) Date of Patent: May 14, 2002

(54) THERMOSETTING RESIN COMPOSITION FOR PRESTRESSED CONCRETE TENDON, ITS USE AND PRESTRESSED CONCRETE TENDON USING THE COMPOSITION

(75) Inventors: Hiroshi Iizuka; Toshio Kobayashi, both of Ichihara; Mutsuhiko Ohnisi; Seiichiro Hirata, both of Amagasaki, all of (JP)

(73) Assignees: Mitsui Chemicals, Inc., Tokyo; Shinko Wire Company, Ltd., Hyogo, both of (JP)

( * ) Notice: Subject to any disclaimer, the term of this patent is extended or adjusted under 35 U.S.C. 154(b) by 0 days.

(21) Appl. No.: 09/557,609

(22) Filed: Apr. 25, 2000

(30) Foreign Application Priority Data

Apr. 28, 1999 (JP) ............................................ 11-121737
Apr. 19, 2000 (JP) ........................................ 2000-117941

(51) Int. Cl.⁷ .................................................. B28B 1/14
(52) U.S. Cl. ...................... 264/228; 428/418; 523/454; 523/455; 523/456; 528/91; 528/93
(58) Field of Search ........................ 264/228; 428/418; 523/454, 455, 456; 528/91, 93

(56) References Cited

U.S. PATENT DOCUMENTS 4,929,650 A    5/1990    Kurauchi et al. ........... 523/455

FOREIGN PATENT DOCUMENTS

JP    6431873 A    2/1989

Primary Examiner—Robert Dawson
Assistant Examiner—D. Ahlward
(74) Attorney, Agent, or Firm—Birch, Stewart, Kolasch & Birch, LLP

(57) ABSTRACT

A thermosetting resin composition for prestressed concrete tendon, wherein the composition does not harden until the completion of the straining of the tendon, which is the inherent object in the post-tension technique, even if the heat storage temperature in the concrete structures elevates from 30° C. to 80° C. or higher due to heat of hydration reaction in setting a concrete, particularly 95° C. that is the maximum temperature in solidifying a concrete, and the composition including the site of 30° C. or lower where there is substantially no partial heat storage due to heat of hydration reaction in setting the concrete hardens within the prescribed period of time under spontaneous environmental temperature after the subsequent natural cooling, thereby achieving anti-rust and anti-corrosion of the tendon and also adhesion and integral bonding of the tendon and the concrete, a use method thereof and a prestressed concrete tendon.

16 Claims, No Drawings

THERMOSETTING RESIN COMPOSITION FOR PRESTRESSED CONCRETE TENDON, ITS USE AND PRESTRESSED CONCRETE TENDON USING THE COMPOSITION

BACKGROUND OF THE INVENTION

1. Field of the Invention

The present invention relates to a thermosetting resin composition for prestressed concrete tendon used for anti-rust and anti-corrosion of a tendon that is used in a post-tension technique of a prestressed concrete, the composition being used also for integral bonding of the tendon and concrete, and the invention also relates to a use method thereof and a prestressed concrete tendon using the composition.

2. Description of the Related Art

A post-tension technique of a prestressed concrete is a technique in which prior to pouring a concrete, a metal- or resin-made sheath having inserted therein a tendon such as PC steel material (PC steel wire, PC steel twisted wire, PC steel rod or the like) is arranged for reinforcement in a concrete form, a concrete is poured into the concrete form, the tendon is strained after the concrete is set, and a cement milk or the like is poured into a space between the sheath and the tendon for the purpose of anti-rust and anti-corrosion of the tendon and also adhesion and integral bonding of the tendon and concrete.

However, in this conventional technique, works of inserting the tendon in the sheath and pouring a cement milk are complicated works and require much time and labor. Further, because a space between the tendon and the sheath is very narrow, filling the space with the concrete milk tends to be incomplete. Japanese Patent Application Laid-Open No. Sho 64-31873 proposes a technique of previously filling a curable composition in a space between a sheath and a tendon. Since in this technique, a curable composition is previously filled in a space between a sheath and a tendon, the space between the sheath and the tendon is completely filled. As a result, improvement in reliability and labor saving in a work site can be achieved.

However, it has been found that there is the following disadvantage in a large-sized concrete structure. Heat of hydration reaction generated in solidifying a concrete accumulates in the structure and a certain portion may reach a high temperature of 80° C. or higher. As a result, if a tendon is arranged for reinforcement in the large-sized structure by applying the above conventional technique, the curable composition filling the space between the sheath and the tendon hardens during the period between a period that a temperature exceeding 80° C. is maintained and a period of the subsequent natural cooling. Then when trying to strain the tendon, it is no longer possible to strain the tendon. Furthermore, it was found that the degree of accumulation of heat of hydration reaction generated in solidifying a concrete differs, and the peripheral temperatures of the tendon differ depending on the place, because the concrete structure in which the tendon is arranged, has a non-uniform thickness and the tendon hangs down when the concrete structure in which tendon is arranged, is long in size.

SUMMARY OF THE INVENTION

Accordingly, a first object of the present invention is to provide a thermosetting resin composition for prestressed concrete tendon, having the desired performances such that, even if a heat storage temperature in the concrete structure elevates from 30 to 85° C. or higher, particularly a temperature reaching 95° C., due to heat of hydration reaction in setting a concrete and this temperature is maintained until the completion of the reaction, the composition does not harden thereby being capable of straining the tendons after setting the concrete, and the composition including the site of 30° C. or lower where there is substantially no partial heat storage due to heat of hydration reaction in solidifying the concrete, hardens after the passage of the prescribed time under spontaneous environmental temperature after the subsequent natural cooling, thereby achieving anti-rust and anti-corrosion of the tendons and also adhesion and integral bonding of the tendons and the concrete.

A second object of the present invention is to provide a use method of the thermosetting resin composition for prestressed concrete tendon, which can obtain a prestressed concrete structure having a desired performance by a post-tension technique using the thermosetting resin composition for prestressed concrete tendon.

A third object of the present invention is to provide a prestressed concrete tendon which is effective to obtain a concrete structure having the desired performances such that the composition does not harden, even if a heat storage temperature in the concrete structure elevates from 30 to 85° C. or higher, particularly a temperature reaching 95° C., due to heat of hydration reaction in setting a concrete and this temperature is maintained until the completion of the reaction, the composition does not harden thereby being capable of straining the tendons after setting the concrete, and the composition including the site of 30° C. or lower where there is substantially no partial heat storage due to heat of hydration reaction in solidifying the concrete, hardens after the passage of the prescribed time under spontaneous environmental temperature after the subsequent natural cooling, thereby achieving anti-rust and anti-corrosion of the tendons and also adhesion and integral bonding of the tendons and the concrete by using the thermosetting resin composition for prestressed concrete tendon.

According to the present invention, there is provided a thermosetting resin composition for prestressed concrete tendon, comprising an epoxy resin, a latent hardener and a hardening accelerating diluent, the composition characterized by being previously heat treated at a temperature of 40 to 140° C. The present invention further provides a use method of the thermosetting resin composition for prestressed concrete tendon, characterized in that the time of from pouring of concrete to straining of the tendon is 7 days or longer and the time of from pouring of concrete to hardening of the thermosetting resin composition is within 350 days.

Further, according to the present invention, there is provided the use method of the thermosetting resin composition for prestressed concrete tendon, characterized in that a maximum heat storage temperature due to hydration reaction of concrete is 80° C. or higher, particularly 80 to 95° C.

The present invention also provides a prestressed concrete tendon using the thermosetting resin composition for prestressed concrete tendon.

DETAILED DESCRIPTION OF THE PREFERRED EMBODIMENT

The present invention is described in detail below regarding a thermosetting resin composition for prestressed concrete tendon (hereinafter referred to as a "composition of the present invention"), its use method and a prestressed concrete tendon using the composition of the present invention.

The composition of the present invention comprises an epoxy resin, a latent hardener and a hardening accelerating diluent as the essential components.

The epoxy resin which is one of the essential components in the composition of the present invention is a liquid resin having two or more epoxy groups in one molecule. Examples of the epoxy resin include polyglycidylated-products of polyhydric phenols such as 2,2-bis(4-hydroxyphenyl)propane, bis(4-hydroxyphenyl) ethane, bis(4-hydroxyphenyl)methane, 2,2-bis(3,5-dibromo-4-hydroxyphenyl)propane, hydroquinone and resorcin.

The epoxy resin is preferably a resin purified such that a hydrolyzable chlorine content therein is reduced to less than 0.07% by weight, preferably 0.05% by weight, and particularly preferably 0.03% by weight. In the present invention, if the latent hardener described hereinafter is reacted with chlorine, hardening time prolongs. Therefore, it is advantageous that the content of the hydrolyzable chlorine is smaller.

Besides the epoxy resins listed above, other epoxy resins can be used in the composition of the present invention for the purpose of, for example, controlling a viscosity of the composition. Examples of the other epoxy resin that can be used include polyglycidylated products of polyhydric alcohols such as ethylene glycol, glycerin or trimethylol propane, and polycarboxylic acids such as phthalic acid.

Examples of the latent hardener include organic acid dihydrazides such as adipic acid dihydrazide or sebacic acid dihydrazide, diphenyldiaminosulfone, dicyandiamide, imidazole derivatives such as 2-methylimidazole and its derivative, ketimine and BF3-amine complex. Of those, organic acid hydrizides, dicyandiamide, imidazole derivatives and $BF_3$.amine complex are preferable for the reason that those have very low reactivity at room temperature and this makes it possible to take a wide control range of curing time by heat treatment of the composition of the present invention.

The blending proportion of the latent hardener in the composition of the present invention varies depending on the kind of the epoxy resin and the hardener to be used, but the amount of the latent hardener having active hydrogen is preferably 1:0.3 to 2.0 in terms of molar ratio of epoxy group to active hydrogen, and since the ionic polymerizable catalyst type latent hardener such as $BF_3$.amine complex or tertiary amine is a catalyst type, the amount thereof can generally be a small amount and is preferably 0.3 to 5 parts by weight per 100 parts by weight of the epoxy resin.

In the composition of the present invention, the hardening accelerating diluent has a role of diluting the epoxy resin and the latent hardener to accelerate hardening. In the composition of the present invention, the hardening reaction does not proceed with only the epoxy resin and the latent hardener. Although the hardening accelerating diluent is not particularly limited, at least one member selected from the group consisting of alcohol and its derivatives, ether, ester, ketone, amide, hydrocarbon and water is preferably used.

Specific examples of the alcohol include methanol, ethanol, isopropyl alcohol, butanol, isobutanol, cyclohexanol, 2-ethylhexanol, furfuryl alcohol and benzyl alcohol.

Specific examples of the alcohol derivative include ethylene glycol and ethylene glycol derivatives such as diethylene glycol, ethylene glycol monomethyl ether, diethylene glycol monoethyl ether, propylene glycol and propylene glycol derivatives such as propylene glycol monomethyl ether.

Specific examples of the ether include dioxane and tetrahydrofuran. Specific examples of the ester include n-butyl acetate, isobutyl acetate, esters of the above-described ethylene glycol derivatives and acetic acid, such as ethylene glycol monoethyl ether acetate, and esters of the above-described propylene glycol derivatives and acetic acid.

Specific examples of the ketone include methyl isobutyl ketone, methyl ethyl ketone, cyclohexanone and isophorone. Specific example of the amide includes dimethyl formamide.

Specific examples of the hydrocarbon include toluene, xylene, cyclohexanone and mineral spirit.

Of those, ethylene glycol derivatives, propylene glycol derivatives, benzyl alcohol and cyclohexanone are preferable from the viewpoint that those are effective to control the hardening time by heat treatment of the composition of the present invention.

The blending proportion of the hardening accelerating diluent in the composition of the present invention is preferably 0.001 to 30 parts by weight, and more preferably 0.002 to 25 parts by weight, per 100 parts by weight of the epoxy resin. If the blending proportion of the hardening accelerating diluent is within this range, it is possible to control hardening time of the composition obtained, which is preferable.

Other than the above-described essential components, the composition of the present invention may contain various additives such as commercially available aerosil, nip seal or amide wax; modifiers such as xylene resin, dicyclopentadiene resin or coumarone resin; fillers such as talc, calcium carbonate, barium sulfate, clay, dolomite or silica; and coloring materials such as titanium dioxide, red iron oxide or phthalocyanine blue, in an amount of not impairing the effect of the present invention for the purpose of controlling a viscosity, imparting thixotropic property, improving strength of a hardened product, or the like.

The composition of the present invention can be produced by stirring and mixing the above-described epoxy resin, latent hardener and hardening accelerating diluent, and various components blended or added according to the need.

The blending proportion and the order of addition of those various component are not particularly limited. However, it is important for the epoxy resin, latent hardener and hardening accelerating diluent to be in a homogeneously dispersed state, and a method is preferable in which the latent hardener and the hardening accelerating diluent are blended with the epoxy resin in which the degree of dispersion of those component can be inspected, the resulting blend is mixed under stirring, and various components blended or added according to the need, are mixed with the above resulting mixture under stirring.

The composition of the present invention is heat treated at a temperature of 40 to 140° C., preferably 60 to 120° C., for a prescribed time after or during stirring and mixing the above-described each component, or under the state that the composition is processed into a prestressed tendon. By this heat treatment, it is possible to control a curing time of the epoxy resin and the latent hardener by the action of the hardening accelerating diluent, and the desired hardening characteristics according to the heat storage temperature pattern due to heat of hydration reaction in setting the objective concrete can be obtained. For example, heat treatment at 90° C. for 24 hours can shorten the setting days of the thus treated composition by about 100 days or more as compared with the composition that is not heat treated, even an environmental temperature of 23° C. in which there is almost no heat storage due to heat of hydration reaction in setting a concrete. If heat treatment at 90° C. for 48 hours is applied, the setting days of such a composition can shorten by 200 days or more as compared with the composition that is not heat treated, even under the environment of 23° C. in which there is almost no heat storage due to heat of hydration reaction in setting a concrete. On the other hand, the days that enables to strain the tendon are all 10 days or more even under the temperature pattern in which the heat storage temperature due to heat of hydration reaction in setting a concrete having a thickness of 90 cm becomes a temperature exceeding 90° C., and this temperature is maintained, and the concrete is already sufficiently set when the tendon is strained.

Temperature of the heat treatment is important in obtaining the desired curability of the composition of the present invention, and the higher temperature is advantageous in that the composition having the desired curability can be produced within a short period of time. However, if the temperature exceeds 140° C., the latent hardener is activated, and there is a fear of runaway reaction, which is not preferable. For example, the curability obtained by the heat treatment at 90° C. for 24 hours substantially corresponds to the curability obtained by the heat treatment at 110° C. for 3 hours.

The composition of the present invention can suitably be used in a post-tension technique as follows. The surface of a prestressed concrete tendon is coated with the composition of the present invention, or the composition of the present invention is charged into a space between a sheath and the tendon simultaneously with an insertion of the tendon in the sheath, the tendon incorporated in the sheath is arranged for reinforcement at a predetermined position of a concrete form, and a concrete is placed in the concrete form. After the concrete has reached the prescribed strength through hydration reaction of concrete, the tendon is strained. In this case, the time from placing of concrete to hardening of the thermosetting resin composition is preferably within 350 days from the viewpoint that a high strength and high durability inherently possessed by a concrete structure obtained by a post-tension technique can be secured at an early stage with high reliability.

Further, in the conventional art, if the maximum heat storage temperature due to heat of hydration reaction in setting a concrete is 80° C. or higher, setting proceeds before the concrete reaches the predetermined strength in the conventional curable composition, and thus it was impossible to strain the tendon. However, by using the prestressed concrete tendon obtained such that the surface of the tendon is coated with the composition of the present invention, or the composition of the present invention is charged into a space between a sheath and the tendon simultaneously with an insertion of the tendon in the sheath, the heat storage temperature inside a concrete structure reaches 80° C., preferably 80 to 95° C., due to heat of hydration reaction in setting a concrete, and the composition does not cure even if the temperature is maintained until substantial completion of hydration reaction. Therefore, it is possible to strain the tendon after setting concrete. Further, the concrete structure having the intended performances can be obtained in which the composition including the site of 30° C. or lower where there is substantially no partial heat storage due to heat of hydration reaction in setting the concrete hardens within the prescribed period of time under spontaneous environmental temperature after the subsequent natural cooling, thereby achieving anti-rust and anti-corrosion of the tendon and also adhesion and integral bonding of the tendon and the concrete.

In the method of using the composition of the present invention, the tendon, sheath and the like to be used are not particularly limited, and ordinarily used ones can be employed according to the purpose of use. In the case where heat treatment is conducted in the sate of processing into a prestressed concrete tendon such that the surface of the tendon is coated with the composition of the present invention and is then covered with a sheath, the sheath is preferably selected from materials having appropriate heat resistance. Although varying depending on the kind of material, heat resistance of the material used in the sheath is, for example, up to 90° C. for a polyethylene, up to 110° C. for a polypropylene and about 140° C. for a polymethyl pentene.

Further, the prestressed concrete tendon using the composition of the present invention can be produced by coating the tendon comprising PC steel stock (PC steel wire, PC steel twisted wire, PC steel rod or the like) with the composition of the present invention, or filling the composition of the present invention in a space between the sheath and the tendon at the same time as the tendon is inserted. For example, the tendon comprising a prestressed concrete steel wire material in which the steel wire is inserted in a polyethylene-made sheath is continuously produced in a factory. In such a case, the thermosetting resin composition of the present invention is filled in a space between the sheath and the steel wire at almost the same time as the steel wire. The tendon comprising the prestressed concrete steel wire produced in a factory is transported to a construction site of concrete structures and arranged for reinforcement in a concrete form concrete is then poured into the concrete form, and after the concrete is set, the steel wire is strained and maintained. Thereafter, the thermosetting resin composition in the prestressed concrete steel wire material is hardened within the prescribed time to integrally bond the concrete and the tendon. Also corrosion of the tendon is prevented and as a result, concrete structures having high reliability can be produced.

EXAMPLES

The present invention is explained in detail with reference to the following examples, but the invention is not limited to those examples. Unless otherwise indicated, all percents, parts, ratios and the like are by weight.

Example 1

A blend of 100 parts of bisphenol A type epoxy resin (viscosity: 13 Pa·S, hydrolyzable chlorine content: 0.01%, epoxy equivalent: 188), 25 parts of bisphenol AD type epoxy resin (viscosity: 3 Pa·S, hydrolyzable chlorine content: 0.01%, epoxy equivalent: 173), 7 parts of dicyandiamide as a latent hardener, 11.5 parts of benzyl alcohol and 0.5 part of ethylene glycol monoethyl ether as hardening accelerating diluent, 35 parts of talc and 35 parts of calcium carbonate as a fillers, and 2 parts of aerosil as an additive was mixed by stirring to obtain a thermosetting resin composition.

The thermosetting resin composition obtained was filled in two sealable vessels each having an inner volume of 220 ml. One of the vessels filled with the thermosetting resin composition was heat treated at 90° C. for 48 hours and then quenched to 23° C. The composition was thereafter allowed to stand in an atmosphere at 23° C., and a penetration was periodically measured. The number of days the composition took to reach a penetration degree of 0 was counted, and this was expressed as solidification days 1. The other vessel filled with the thermosetting resin composition was allowed to stand in an atmosphere at 23° C. without heat treatment, and a penetration of the composition was periodically measured. The number of days the composition took to reach a penetration degree of 0 was counted, and this was expressed as solidification days 2.

After again stirring the thermoplastic resin composition obtained above, and conducting heat treatment with the same condition of 60° C. for 7 hours, the resulting composition was applied to the surface of a steel wire-made tendon, and the coated surface of the tendon was covered with a polyethylene-made sheath to prepare a post-tension tendon. The post-tension tendon thus prepared was arranged for reinforcement at nearly a center in a thickness direction of a concrete form having a vertical size of 300 cm, a horizontal size of 300 cm and a thickness of 90 cm, and concrete was then placed in the concrete form. The concrete developed the predetermined strength in one week. After 10 days from placing of the concrete, the steel wire of the tendon arranged was strained by pulling the steel wire and then fixed. In this case, elongation of the steel wire was 20 mm and normal tension was applied to the steel wire.

At this time, the heat storage temperature in the vicinity of the tendon during the set process of concrete was continuously measured. As a result, the accumulated heat temperature in the vicinity of the tendon reached the maximum accumulated heat temperature at 92° C. after about 24 hours from pouring of the concrete. This temperature was maintained for about 12 hours, and the temperature was then gradually dropped and reached nearly the same temperature as the atmospheric temperature after 120 hours.

Example 2

A blend of 100 parts ("parts by weight"; hereinafter the same)of bisphenol A type epoxy resin (viscosity: 13 Pa·S, hydrolyzable chlorine content: 0.01%, epoxy equivalent: 188), 30 parts of bisphenol F type epoxy resin (viscosity: 3.5 Pa·S, hydrolyzable chlorine content: 0.01%, epoxy equivalent: 176), 7 parts of dicyandiamide as a latent hardener, 20 parts of benzyl alcohol as a hardening accelerating diluent, 40 parts of talc and 35 parts of calcium carbonate as a fillers, and 2 parts of aerosil as an additive was mixed by stirring to obtain a thermosetting resin composition.

The thermosetting resin composition obtained was filled in two sealable vessels each having an inner volume of 220 ml and solidification days 1 and 2 were obtained in the same manner as in Example 1.

The thermosetting resin composition was heat treated at 70° C. for 7 hours and applied to the surface of a tendon, and this tendon was covered with a sheath, in the same manners as in Example 1, to prepare a post-tension tendon. The post-tension tendon thus prepared was arranged for reinforcement at nearly the center in a thickness direction of a concrete form having a length of 300 cm, a width of 300 cm and a thickness of 90 cm, and concrete was poured into the concrete form. In this case, elongation of the steel wire was 18 mm and normal tension was applied to the steel wire.

At this time, the temperature change in the vicinity of the post-tension tendon during the set process of concrete was continuously measured in the same manner as in Example 1. As a result, the temperature change in the vicinity of the post-tension tendon during the set process of concrete showed the same behavior as in Example 1.

The results obtained are shown in Table 1.

Example 3

A composition composed of a blend of 100 parts of bisphenol A type epoxy resin (viscosity: 13 Pa·S, hydrolyzable chlorine content: 0.04%, epoxy equivalent: 188), 25 parts of bisphenol F type epoxy resin (viscosity: 3.5 Pa·S, hydrolyzable chlorine content: 0.04%, epoxy equivalent: 176), 7 parts of dicyandiamide as a latent hardener and 13 parts of benzyl alcohol as a hardening accelerating diluent was heat treated by mixing the same at 110° C. for 3 hours under heating, and then cooled to 60° C. or lower.

40 parts of talc and 35 parts of calcium carbonate as a filler and 2 parts of aerosil as an additive were added to 145 parts of the composition obtained above. The resulting mixture was mixed by stirring to obtain a thermosetting resin composition.

The thermosetting resin composition obtained above was filled in two sealable vessels each having an inner volume of 220 ml and solidification days 1 and 2 were obtained in the same manner as in Example 1.

The thermosetting resin composition was applied to the surface of a tendon, and this tendon was covered with a sheath to prepare a post-tension tendon. The post-tension tendon thus prepared was arranged for reinforcement at nearly the center in a thickness direction of a concrete form having a length of 300 cm, a width of 300 cm and a thickness of 90 cm, and concrete was poured into the concrete form. In this case, elongation of the steel wire was 21 mm and normal tension was applied to the steel wire.

At this time, the temperature change in the vicinity of the post-tension tendon during the set process of concrete was continuously measured in the same manner as in Example 1. As a result, the temperature change in the vicinity of the post-tension tendon during the set process of concrete showed the same behavior as in Example 1.

The results obtained are shown in Table 1.

Comparative Example 1

A blend of 100 parts of bisphenol A type epoxy resin (viscosity: 13 Pa·S, hydrolyzable chlorine content: 0.04%, epoxy equivalent: 188), 25 parts of bisphenol F type epoxy resin (viscosity: 3.5 Pa·S, hydrolyzable chlorine content: 0.01%, epoxy equivalent: 176), 7 parts of dicyandiamide as a latent hardener, 0.02 part of 2,4,6-dimethylaminomethyl phenol of a tertiary amine and 13 parts of benzyl alcohol as hardening accelerating diluent, 35 parts of talc and 35 parts of calcium carbonate as filler, and 2 parts of aerosil as an additive was mixed by stirring to obtain a thermosetting resin composition.

The thermosetting resin composition obtained was filled in two sealable vessels each having an inner volume of 220 ml and solidification days 1 and 2 were obtained in the same manner as in Example 1.

The thermosetting resin composition was applied to the surface of a tendon, and this tendon was covered with a sheath to prepare a post-tension tendon. The post-tension tendon thus prepared was arranged for reinforcement at nearly the center in a thickness direction of a concrete form having a length of 300 cm, a width of 300 cm and a thickness of 90 cm and also at positions of 10 cm and 22 cm from a portion corresponding to the surface of a concrete molded product to be obtained, and then concrete was poured into the concrete form. After the concrete was set, the tendon was strained at the same timing as in Example 1. At this time, the temperature change in the vicinity of the post-tension tendon during the set process of concrete was continuously measured in the same manner as in Example 1.

As a result, regarding the temperature change in the vicinity of the post-tension tendon during the set process of concrete, the temperature change in the vicinity the tendon arranged for reinforcement nearly at the center in the thickness of concrete showed the same behavior as in Example 1, and the temperature change in the vicinity of the post-tension tendon arranged for reinforcement at the position of 22 cm from the surface showed the same behavior as the temperature change in Example 1 except that the maximum accumulated heat temperature was 82° C. Further, the temperature change in the vicinity of the post-tension tendon arranged for reinforcement at the position of 10 cm from the surface showed the same behavior as the temperature change in Example 1 except that the maximum accumulated heat temperature was 72° C.

The results obtained are shown in Table 1.

TABLE 1

|  | Example 1 | Example 2 | Example 3 | Comparative Example 1 |
|---|---|---|---|---|
| Tension Property 1 | ○ | ○ | ○ | X |
| Tension Property 2 | — | — | — | X |
| Tension Property 3 | — | — | — | ○ |
| Solidification Days 1 | 230 | 180 | 180 | 220 |
| Solidification Days 2 | 450 | 370 | 370 | 730 |

Tension property 1: Maximum accumulated heat temperature is 92° C. when the reinforcement position is nearly at the center in the thickness direction.

Tension property 2: Maximum accumulated heat temperature is 82° C. when the reinforcement position is at a position of 22 cm from the surface.

Tension property 3: Maximum accumulated heat temperature is 72° C. when the reinforcement position is at a position of 10 cm from the surface.

○: Tension possible (when a steel wire is pulled under a load to the extent that the steel wire is elongated by 6–7 mm/min, the steel wire is exposed)

X: Tension impossible (when a steel wire is pulled under a load to the extent that the steel wire is elongated by 6–7 mm/min, the steel wire is not exposed)

Solidification days 1 (day): The number of days a heat-treated product (90° C., 48 hours) takes to reach a penetration degree of 0.

Solidification days 2 (day): The number of days a non-heat treated product (allowed to stand at 23° C.) takes to reach a penetration degree of 0.

In the conventional technique, if the accumulated heat temperature accompanying heat of hydration reaction when concrete is set exceeds 80° C., it is impossible to strain a prestressed concrete tendon when the concrete reaches a predetermined strength, and concrete structures having high reliability that is the primary object were not obtained. Contrary to this, when a prestressed concrete tendon using the composition of the present invention is applied to concrete structures showing high accumulated heat temperature due to heat of hydration reaction, the composition does not harden even if the accumulated heat temperature in the concrete structures elevates up to 30 to 95° C., and it is possible to strain the tendon after concrete is set. The composition hardens after the passage of a given time, thereby preventing the tendon from rusting and corroding, and also achieving adhesion and integral bonding of the tendon and concrete. Thus, the composition of the present invention can be used in a wide temperature range and concrete structures having high reliability can be produced. In particular, the composition of the present invention does not harden for 7 days or longer from pouring of concrete to straining of the tendon after the concrete is set even if the accumulated heat temperature due to heat of hydration reaction when concrete is set is higher than 80° C. to 95° C., and can harden within 550 days thereafter, which is advantageous.

Further, according to the method of the present invention, a prestressed concrete structure having a desired performance can be obtained by a post-tension technique using the thermosetting resin composition for a prestressed concrete tendon.

Furthermore, the prestressed concrete tendon of the present invention uses the thermosetting resin composition for a prestressed concrete tendon, and the composition does not harden until the completion of the straining of the tendon, which is the inherent object in the post-tension technique, even if the heat storage temperature in the concrete structures elevates from 30° C. to 80° C. or higher due to heat of hydration reaction in setting a concrete, particularly 95° C. that is the maximum temperature in solidifying a concrete, and the composition including the site of 30° C. or lower where there is substantially no partial heat storage due to heat of hydration reaction in setting the concrete hardens within the prescribed period of time under spontaneous environmental temperature after the subsequent natural cooling, thereby achieving anti-rust and anti-corrosion of the tendon and also adhesion and integral bonding of the tendon and the concrete. Thus, tendon according to the present invention is suitable.

What is claimed is:

1. A thermosetting resin composition for prestressed concrete tendon, comprising an epoxy resin, a latent hardener and a hardening accelerating diluent, wherein said composition is previously heat treated at a temperature of 40 to 140° C.

2. The thermosetting resin composition for prestressed concrete tendon as claimed in claim 1, wherein said hardening accelerating diluent is at least one member selected from the group consisting of alcohol, ether, ester, ketone, amide, hydrocarbon and water.

3. The thermosetting resin composition for prestressed concrete tendon as claimed in claim 1 or 2, wherein said hardening accelerating diluent is contained in an amount of 0.001 to 30 parts by weight per 100 parts by weight of said epoxy resin.

4. The thermosetting resin composition for prestressed concrete tendon as claimed in claim 1 or 2, wherein said hardening accelerating diluent is at least one member selected from the group consisting of ethylene glycol monomethyl ether, ethylene glycol dimethyl ether, benzyl alcohol and cyclohexanone.

5. The thermosetting resin composition for prestressed concrete tendon as claimed in claim 1, wherein said latent hardener is an ionic harder and said ionic hardener is used in an amount of 0.3 to 5 parts by weight per 100 parts by weight of said epoxy resin.

6. A prestressed concrete tendon using the thermosetting resin composition for prestressed concrete tendon as claimed in claims 1 or 2.

7. The thermosetting resin composition for prestressed concrete tendon as claimed in claim 1, wherein said epoxy resin is a liquid resin having two or more epoxy groups in one molecule.

8. The thermosetting resin composition for prestressed concrete tendon as claimed in claim 1, wherein said epoxy resin is selected from the group of polyglycidylated products consisting of 2,2-bis(4-hydroxyphenyl)propane, bis(4-hydroxyphenyl)ethane, bis(4-hydroxyphenyl)methane, 2,2-bis(3,5-dibromo-4-hydroxyphenyl)propane, hydroquinone and resorcin.

9. The thermosetting resin composition for prestressed concrete tendon as claimed in claim 1, wherein the latent hardener is selected from the group consisting of organic acid dihydrazides, diphenyldiaminosulfone, dicyandiamide, imidazole derivatives, ketamine and $BF_3$.amine complex.

10. The thermosetting resin composition for prestressed concrete tendon as claimed in claim 1, wherein the amount of latent hardener having an active hydrogen is 1:0.3 to 2.0 in terms of molar ratio of epoxy group to active hydrogen.

11. The thermosetting resin composition for prestressed concrete tendon as claimed in claim 1, wherein the hardening accelerating diluent is selected from the group consisting of methanol, ethanol, isopropyl alcohol, butanol, isobutanol, cyclohexanol, 2-ethylhaxanol, furfuryl alcohol, benzyl alcohol, ethylene glycol, diethyleneglycol, ethylene glycol monomethyl ether, diethylene glycol monoethyl ether, propylene glycol, propylene glycol monomethyl ether, dioxane, tetrahydrofuran, n-butyl acetate, isobutyl acetate, ethylene glycol monoethyl ether acetate, methyl isobutyl ketone, methylethyl ketone, cyclohexanone, isophorone, dimethylformamide, toluene, xylene and mineral spirits.

12. A method of preparing a prestressed concrete tendon, comprising the steps of:

coating a tendon with a thermosetting resin composition previously heat treated at a temperature of 40 to 140° C., said composition comprising an epoxy resin, a latent hardener and a hardening accelerating diluent, or charging a space between a tendon and a sheath with said thermosetting resin, said tendon comprising steel stock;

arranging said tendon in a concrete form, and pouring concrete into concrete form.

13. The method according to claim 12, further comprising straining and maintaining said tendon, wherein the time from pouring of concrete to straining of the tendon is 7 days or longer, and the time from pouring concrete to hardening the thermosetting resin composition is within 350 days.

14. The method according to claim 12, further comprising setting concrete into the concrete form, wherein a maximum heat storage temperature due to heat of hydration reaction in setting of concrete is 80° C. or higher.

15. The method according to claim 12, further comprising setting concrete into the concrete form, wherein a maximum heat storage temperature due to heat of hydration reaction in setting of concrete is 80 to 95° C.

16. The method according to claim 12, further comprising setting concrete in the concrete form, straining and maintaining said tendon, and hardening said thermosetting resin composition.

* * * * *

UNITED STATES PATENT AND TRADEMARK OFFICE
CERTIFICATE OF CORRECTION

PATENT NO. : 6,387,310 B1
DATED : May 14, 2002
INVENTOR(S) : Hiroshi Iizuka et al.

It is certified that error appears in the above-identified patent and that said Letters Patent is hereby corrected as shown below:

<u>Title page,</u>
Item [75], Inventors, please correct the third inventor's name from
"Mutsuhiko Ohnisi" to -- Mutsuhiko Ohnishi --.

Signed and Sealed this

Fifth Day of November, 2002

*Attest:*

*Attesting Officer*

JAMES E. ROGAN
*Director of the United States Patent and Trademark Office*